US010568254B2

(12) United States Patent
Steiner et al.

(10) Patent No.: US 10,568,254 B2
(45) Date of Patent: Feb. 25, 2020

(54) TRACTOR SYSTEM AND METHOD

(71) Applicant: Venture Products, Inc., Orrville, OH (US)

(72) Inventors: Roy I. Steiner, Dalton, OH (US); Mark E. Steiner, Dalton, OH (US)

(73) Assignee: Venture Products, Inc., Orrville, OH (US)

( * ) Notice: Subject to any disclaimer, the term of this patent is extended or adjusted under 35 U.S.C. 154(b) by 155 days.

(21) Appl. No.: 15/241,126

(22) Filed: Aug. 19, 2016

(65) Prior Publication Data

US 2017/0055430 A1 Mar. 2, 2017

Related U.S. Application Data

(60) Provisional application No. 62/209,945, filed on Aug. 26, 2015.

(51) Int. Cl.
*A01B 59/06* (2006.01)
*B62D 49/06* (2006.01)

(52) U.S. Cl.
CPC .......... *A01B 59/065* (2013.01); *A01B 59/066* (2013.01); *B62D 49/065* (2013.01)

(58) Field of Classification Search
CPC ..... A01B 59/00; A01B 59/044; A01B 59/066; A01B 59/068; A01B 63/102; A01B 63/104; A01B 63/106; A01B 63/118; A01B 59/043; A01B 59/06; A01B 59/065; B62D 49/065
USPC ................................................ 172/444, 774
See application file for complete search history.

(56) References Cited

U.S. PATENT DOCUMENTS

| 2,445,145 | A |   | 7/1948  | Love                         |
|-----------|---|---|---------|------------------------------|
| 2,979,137 | A |   | 4/1961  | Hess                         |
| 3,220,751 | A |   | 11/1962 | Tweedale                     |
| 3,528,685 | A |   | 9/1970  | Eastman                      |
| 3,653,446 | A |   | 4/1972  | Kalmon                       |
| 3,680,880 | A |   | 8/1972  | Blaauw                       |
| 3,756,326 | A | * | 9/1973  | Yordy ............. A01B 59/044 |
|           |   |   |         | 172/298                      |
| 4,090,725 | A | * | 5/1978  | Perin ............... A01B 59/062 |
|           |   |   |         | 172/272                      |
| 4,383,791 | A |   | 5/1983  | King                         |
| 5,064,078 | A | * | 11/1991 | Van Staveren ..... B60P 1/548 |
|           |   |   |         | 212/180                      |

(Continued)

*Primary Examiner* — Matthew Troutman
(74) *Attorney, Agent, or Firm* — Sand, Sebolt & Wernow Co., LPA (57) ABSTRACT

An attachment system for removably attaching an implement under a vehicle. The mounting system includes a vehicle frame. The vehicle frame has a pair of spaced apart frame portions. Each of a pair of hitch receiving points is connectable with a respective one of the frame portions. An implement includes support structure extending for a length. A pair of hitch pins is associated with the support structure. The hitch pins are spaced apart in a direction along the length of the support structure. Each hitch pin is for attachment to a respective one of the hitch receiving points. A structural member is associated with the support structure and has a portion adapted to attach to structure outboard of a frame portion. A lift mechanism is connectable with a portion of the vehicle frame. The lift mechanism is attachable with the structural member to move the hitch pins relative to the hitch receiving points.

13 Claims, 5 Drawing Sheets

(56) References Cited

U.S. PATENT DOCUMENTS

| | | | | |
|---|---|---|---|---|
| 5,169,279 | A * | 12/1992 | Zimmerman | A01B 59/062 |
| | | | | 172/439 |
| 5,281,078 | A * | 1/1994 | Mills, Jr. | B66C 23/44 |
| | | | | 212/180 |
| 5,520,498 | A | 5/1996 | DiBartolomeo | |
| 5,746,275 | A * | 5/1998 | Cross | A01B 59/068 |
| | | | | 172/246 |
| 6,672,568 | B1 * | 1/2004 | Rawlinson | A01B 59/066 |
| | | | | 254/323 |
| 7,273,342 | B2 | 9/2007 | DeSilvio | |
| 7,575,120 | B2 * | 8/2009 | Beatty | B66C 23/44 |
| | | | | 212/180 |
| 8,360,707 | B2 | 1/2013 | Pratt | |
| 8,479,933 | B2 * | 7/2013 | Vaquera | B66C 23/44 |
| | | | | 212/177 |
| 9,775,276 | B2 * | 10/2017 | Hyder | A01B 59/043 |
| 2007/0290181 | A1 * | 12/2007 | Bell | B60P 1/548 |
| | | | | 254/323 |
| 2016/0326770 | A1 | 11/2016 | Breeden, III | |
| 2017/0071132 | A1 | 3/2017 | Dunn et al. | |
| 2017/0079191 | A1 | 3/2017 | Cunningham et al. | |

* cited by examiner

TRACTOR SYSTEM AND METHOD

CROSS-REFERENCE TO RELATED APPLICATIONS

This application claims the benefit of U.S. Provisional Patent Application Ser. No. 62/209,945 filed on Aug. 26, 2015.

TECHNICAL FIELD

This disclosure generally relates to tractors having interchangeable implements. More particularly, this disclosure relates to an installation/removal system for agricultural tractors that utilize interchangeable implements.

BACKGROUND

For many years, the agricultural industry utilized tractors featuring the ability to accommodate interchangeable implements. A tractor with the ability to accommodate interchangeable implements is particularly beneficial to farm or agricultural operations as it allows a single tractor to perform multiple functions. Thus, the need for multiple tractors that are intended for specific particular functions is eliminated, which reduces operational costs.

Typically, interchangeable implements are either attached to the tractor on an attachment hitch system located on the rear of the tractor and are pulled behind the tractor during operation. Some larger tractors provide for attachment of implements to the front of the tractor using a front attachment hitch system that is similar in concept to the rear attachment hitch system. Such front attachment hitch systems are not commonly employed on tractors that are used in some farm or agricultural operations. Alternately, the implements are attached to an attachment hitch system that is located in a midsection of the tractor beneath a tractor frame.

In tractors that feature the rear attachment hitch system to accommodate implements, installation/removal of the implements can be relatively simple. To attach or install an implement, a tractor operator is only required to back up the tractor so that the implement is in close proximity to the rear attachment hitch system. The implement is then lifted and attached to the rear attachment hitch system. These implement installation/removal systems that feature the attachment of implements to the rear attachment hitch system of tractors may be adequate for many applications. A major disadvantage of such systems is that the operator of the tractor is unable to see the implement during operation of the tractor without physically looking backwards, which can affect forward looking vision, steering accuracy and operator comfort.

In some uses of the tractor, it is beneficial for the operator of a tractor to view the attached implement during use. A tractor that features an implement installation/removal system which allows for mounting or installation of the implement underneath the frame, and visible to the operator during use, is generally desirable. Conventional methods of mounting/installing and detaching/removing implements from tractors featuring attachment of the implement under the tractor frame can be complex and time consuming. This is due in large part to the hitch system design that is used to secure the implement to the tractor.

In prior art installation/removal systems for implements installed under the tractor frame, a three-point or four-point hitch system is generally utilized to secure the implement in place during operation of the equipment. Typically for a three-point hitch system, the implement rests on two hitch points attached to the tractor frame on each side of the tractor so that the implement is centered relative to the frame. A bracket is attached to the center of the implement and extends upwardly from the implement. The bracket is mechanically attached to a third hitch point located about on or near the longitudinal centerline of the tractor frame by bolts or other means known in the art. Attachment of the implement to the two hitch points that the implement rests on and the third hitch point that is typically located on the longitudinal centerline of the tractor frame adequately secures the implement under the frame during normal operation of the equipment. For a four-point hitch system, a similar configuration is employed, with the exception that the third hitch point is replaced by two spaced-apart hitch points located on either side of the longitudinal centerline of the tractor frame.

In a conventional change-out of implements that are installed underneath the frame, the operator of the tractor must first drive the tractor to a suitable lifting device, such as a crane, which typically is often located remotely from the tractor. To detach or remove the implement, the operator must attach the crane to the bracket that is attached to the middle of the implement. Because the implement bracket is centered relative to the implement, attachment to the implement bracket is necessary to ensure a balanced lift of the implement from two hitch points of the three-point hitch during removal of the implement. Once the crane is attached to the implement bracket, the operator must then remove the structure securing the bracket to the third hitch point that is located on the longitudinal centerline of the tractor frame. The operator must then hoist the implement utilizing the attached crane high enough to ensure that the implement clears the two hitch points upon which the implement rests located on each side of the tractor frame.

Once the implement is free from the two hitch points, the operator must maneuver the implement from under the tractor frame towards one side of the tractor. Because of interference from the frame and the various frame components, to successfully remove the implement completely from under the tractor, the operator must perform a series of lift/release, movement and attachment/deattachment of the crane to the implement bracket in order to successfully maneuver the implement from beneath the tractor. To attach a new implement to the tractor frame, the operator may then have to drive the tractor to another location near the new implement, move the crane to the location of the new implement, and perform the removal steps previously described in reverse. If a single operator is performing the removal/installation of implements the removal of an implement and the subsequent installation of a new implement can result in a significant amount of time that the tractor is unavailable.

An alternative to the use of a crane is a carrier system, in which the implement is placed on a carrier that includes wheels or rollers. The carrier is rolled to the tractor and the implement being removed is placed on the carrier and rolled away. The implement being installed on the tractor is then placed on the carrier and rolled over to the tractor. However, the carrier system requires additional ground clearance on the part of the tractor due to the height of the wheels or rollers on the carrier and must be located near the implement change-out station. Further, the wheels or rollers do not function well on rough, uneven, dirt, mud or gravel surfaces that are common in many farm or agricultural operations. As a result, carrier systems are often undesirable for tractors that are used on such farms or agricultural operations. Another installation/removal alternative is for the operator to use a loader, such as a front end loader or skid steer, to support and lift the implement. Another common alternative is for one or two people to physically maneuver the implement onto or off of the hitch points under the frame. This method requires physical exertion and can be risky.

As a result, there are disadvantages associated with conventional implement installation/removal systems for agricultural tractors featuring the ability to accommodate interchangeable implements under the tractor. Thus, there is a need for an implement installation/removal system that provides the advantages of an implement installed under the tractor, while providing operators the ability to quickly change-out implements, significantly reduce equipment unavailability.

BRIEF SUMMARY

This summary is provided to introduce concepts in a form that are described below in the detailed description. This summary is not intended to identify key factors or essential features of the claimed subject matter, nor is it intended to be used to limit the scope of the claimed subject matter.

The implement installation/removal system for agricultural tractor implements, and method of using the system of the disclosed subject matter overcomes the disadvantages of conventional installation/removal systems. Specifically, the disclosed subject matter is directed to a self-contained implement installation/removal system featuring a crane and a modified three-point hitch, which allows for quick removal/installation of implements under the tractor, thereby significantly reducing equipment unavailability. This can be particularly attractive for many farm or agricultural operations.

A mounting system for removable attachment of an implement to a vehicle such as a tractor, is disclosed according to one aspect. The mounting system includes a vehicle frame. The vehicle frame has a pair of spaced apart frame portions extending in substantially the same direction. The mounting system also includes a pair of hitch receiving points. Each hitch receiving point is connected to respective structure that is attached to the frame. An implement includes support structure that extends for a length. Two hitch pins are associated with the support structure. The hitch pins are spaced apart in a direction along the length of the support structure. Each one of the hitch pins is for attachment to a respective one of the hitch receiving points. A structural member is associated with the support structure and has a portion adapted to attach to structure outboard of a frame portion. A lift mechanism is connectable with a portion of the vehicle frame. The lift mechanism is connectable with the structural member outside of the vehicle frame to move the hitch pins relative to the hitch receiving points. The implement can then be moved from under the tractor.

The structural member is attached to the implement at a location offset in a direction along the length of the implement from the midpoint of the length of the implement. The structural member may be located entirely outward of the vehicle frame. The attachment system includes a link that is removably attachable between the structural member and the vehicle frame. The attachment system also includes a lift bar connectable with the structural member and has a portion extending in a direction towards a midpoint of the implement. The lift bar is constructed and positioned when attached to the structural member so the vehicle frame does not impede removal and installation of the implement.

A method of mounting or dismounting an implement under a vehicle, according to another aspect, includes providing a vehicle having a vehicle frame with a pair of spaced apart frame portions that extend in substantially the same direction. A pair of hitch receiving points is connect to the vehicle frame. Each hitch receiving point connects with a respective structure that is attached to the frame. An implement is provided that includes support structure extending for a length. A pair of hitch pins is associated with the support structure and spaced apart in a direction along the length of the support structure. Each hitch pin is for attachment to a respective one of the hitch receiving points. A structural member is associated with the support structure and has a portion adapted to attach to structure outboard of a frame portion. The implement is mounted or dismounted with a lift mechanism connected with a frame portion of the vehicle frame. The lift mechanism attaches to a lift bar that is attached to the structural member to move the hitch pins relative to the hitch receiving points.

An implement mounting, according to yet another aspect, has a 3-point mounting hitch structure for removable attachment to a vehicle. The vehicle has a vehicle frame with a pair of spaced apart frame portions extending in substantially the same direction. A pair of hitch receiving points is provided. Each hitch receiving point is connectable with a respective structure that is attached to the frame. The implement includes support structure extending for a length. A pair of hitch pins is associated with the support structure. The hitch pins are spaced apart in a direction along the length of the support structure. Each hitch pin is for operative attachment to a respective one of the hitch receiving points. A structural member is associated with the support structure. The structural member has a portion offset from the midpoint of the length of the support structure.

BRIEF DESCRIPTION OF THE DRAWINGS

The following description and drawings set forth certain illustrative aspects and implementations of the disclosed subject matter. These are indicative of but a few of the various ways in which one or more aspects and implementations may be employed. Further features will become apparent from reading the following description with reference to the accompanying drawings, in which.

DETAILED DESCRIPTION

The subject matter is described with reference to the drawings, in which like reference numerals are used to refer to like elements throughout the description. In the description, for purposes of explanation, numerous specific details are set forth in order to provide an understanding of the disclosed and claimed subject matter. It will be understood, however, that the disclosed subject matter can be practiced without these specific details.

An implement installation/removal system, according to one aspect of this disclosure, overcomes the disadvantages associated with prior art installation/removal systems for implements that are installed under a tractor frame. Specifically, the implement installation/removal system features the ability to accommodate interchangeable implements by providing a modified three-point hitch system and integral lift mechanism for securing implements under the tractor frame. This implement installation/removal system allows simple and quick removal/installation of implements under a tractor so the operator may observe the implement in use.

More specifically, the implement installation/removal system according to one aspect, utilizes a modified three-point hitch which features two hitch pins attached under each side of the tractor frame, on which the implement rests. A structural member is used to mechanically attach the implement to a location outside of the tractor frame. In addition, the system features a crane that is removably installed on the tractor frame at the time of installation or removal of implements. This allows for easy and convenient attachment with the structural member to assist in mounting/installing or dismounting/removing the implement under the tractor frame.

The structural member allows attachment of the implement by the crane at a location outside of the tractor frame so only a single lifting operation is required to install and remove the implement. When the crane is attached to the implement bracket only a relatively simple arcuate movement is required to move the implement under the tractor. The simple removal/installation of tractor implements installed under the tractor frame significantly reduces implement change-out time, and thus significantly reduces equipment downtime and operational costs.

Figure 1:
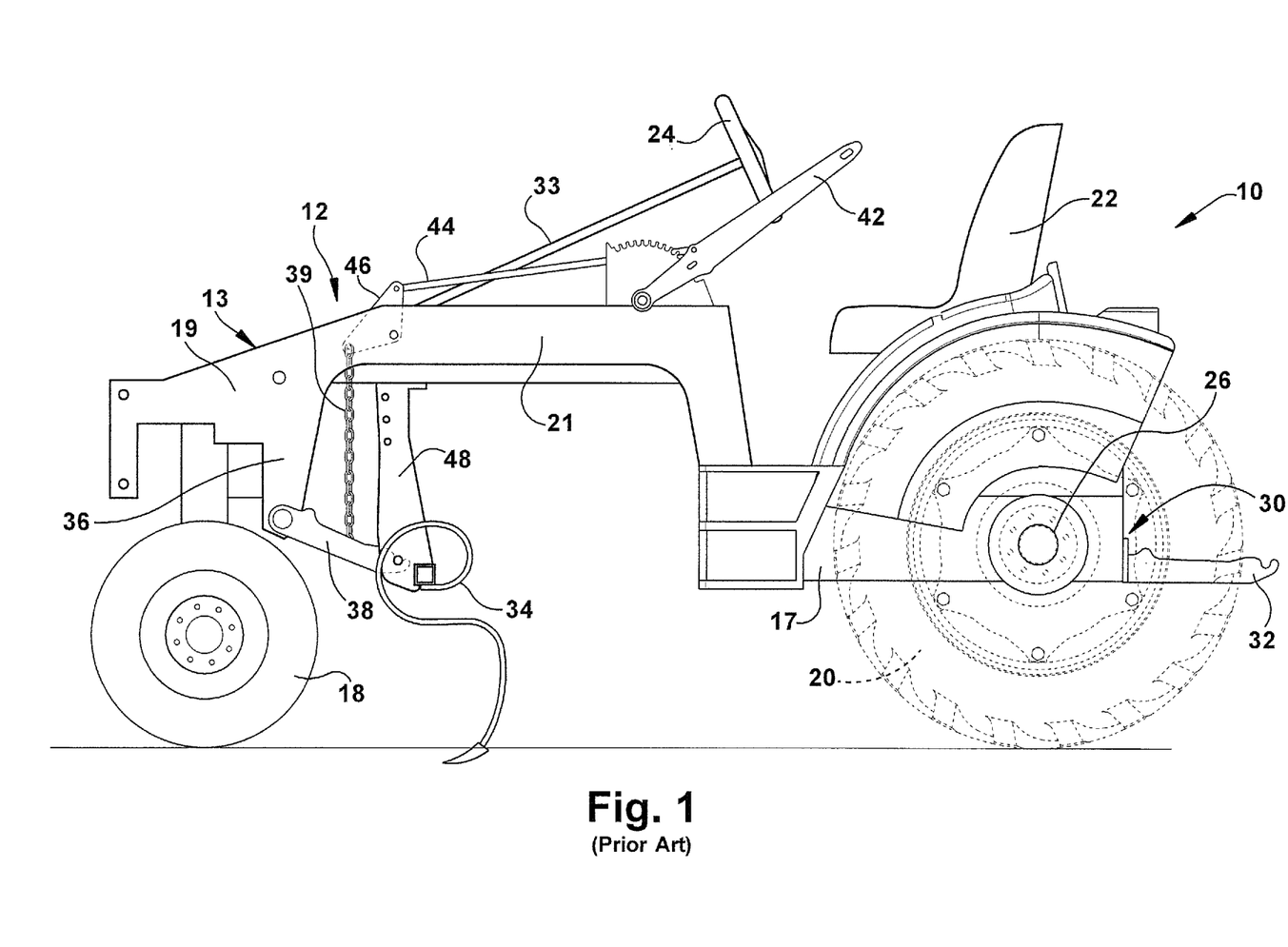
FIG. 1 is a side elevational view of a tractor, showing an implement installed under the frame of the tractor utilizing a conventional three-point hitch of the prior art.

In order to better understand the implement installation/removal system according to one aspect, the environment in which it operates will now be described. A tractor 10 featuring a conventional implement installation/removal system is shown in FIG. 1. Tractor 10 has a frame 12, an engine (not shown), a steering gear system (not shown), a pair of front wheels 18, a pair of rear wheels 20, a transmission (not shown), an operator seat 22, and a steering wheel 24, as is known.

The frame 12 includes a pair of longitudinally extending frame rails 13 positioned on opposite sides of the tractor 10 and having a mid-portion formed in a generally C-shaped configuration. With respect to tractor 10, the majority of components positioned on one side of the vehicle will have correspondingly similar components positioned on the other side of the vehicle. Accordingly, in this description, when reference is made to a particular component of the tractor 10, it will be understood that a similar component is present on the opposite side of the tractor, unless otherwise apparent.

Frame rails 13 have a forward extending front frame section 19, an implement accommodating middle frame section 21, and a longitudinally extending rear frame section 17. Frame rails 13 have a plurality of cross braces (not shown) welded between the frame rails to provide additional support to frame 12 and accommodate tractor components in a known manner.

Each longitudinally extending rear frame section 17 includes an axle housing (not shown) with a rear drive axle 26 transversely extending through the rear longitudinal frame sections. Rear wheels 20 are rotatably mounted to opposite end portions of the drive axle 26 located outward of the rear frame sections 17 of the tractor 10.

The engine 16 is attached to the transmission as is known. The transmission has a transmission output shaft (not shown), which is attached to drive axle 26 by coupling structure, such as sheaves, pulleys, belt or chain. The output of the engine 16 is transferred to the transmission, through one or more gear ratios, and then is transferred to drive axle 26 which drives rear wheels 20. The operator seat 22 is mounted to frame 12 as is known. The steering gear system includes a steering shaft 33 that extends to and connects to steering wheel 24, thereby enabling the operator to turn front wheels 18, as is known.

An implement hitch bracket 30 is welded or otherwise rigidly attached to each longitudinally extending rear frame section 17 and extends rearward from the back end of the frame section. A rear implement three-point hitch receiver device 32 is attached to implement hitch bracket 30. An implement (not shown) rests on two lower points of implement three-point hitch receiver device 32 that are centered relative to the longitudinal centerline of frame 12. In conventional attachment of a rear implement, a bracket (not shown) is mechanically or rigidly attached at about the center of the implement. A top link (not shown) is used to attach the implement bracket to tractor 10 at about the longitudinal center of frame 12. The top link cooperates with the two lower points to enable the implement three-point hitch receiver device 32 to secure a rear implement to the tractor 10.

Implement accommodating middle frame section 21 extends upwardly and longitudinally from the front end of the rear frame section 17, and is continuously formed with the front frame section 19. Situated in this manner, middle frame section 21 creates a downward facing C-shape portion in frame 12 that is capable of accommodating the installation and operation of an implement 34 below the frame 12 of the tractor 10.

Front frame section 19 features a downwardly extending side portion 36. A three-point implement hitch receiver 38 is pivotally mounted to the side portion 36 by mechanical means such as bolts or other suitable means known in the art. A plate or inner frame unit 46 is pivotally connected to the inboard surfaces of each implement accommodating middle frame section 21 and is attached to each implement hitch receiver 38 by a chain 39 or other means known in the art. A depth control lever 42 is attached to middle frame section 21 and is reachable by an operator in seat 22. A linkage 44 extends between and is mechanically attached to inner frame unit 46 and depth control lever 42. Attached in this manner, depth control lever 42 provides a way to enable adjustment of the depth of the attached implement 34 during operation of tractor 10. It is also common for the operator to use hydraulic assist to adjust depth of the implement 34 and to lift or lower the implement.

The implement 34 rests across each implement hitch receiver 38 so that it is centered under implement accommodating middle frame section 21. A bracket 48 is attached to the implement 34 at about the center of the implement length and extends upwardly from the implement. Bracket 48 is mechanically attached to a crossbeam (not shown) of frame rail 13 on the longitudinal centerline of the frame 12 by bolts or other means. Additionally, bracket 48 has an attachment point (not shown) for attaching lifting structure, such as a crane (not shown), to the bracket during removal/installation of the implement 34.

Because bracket 48 is attached with frame rail 13 at the longitudinal centerline of the frame, removal/installation of implement 34 utilizing a separate crane mechanism is a particularly complex and time consuming operation because the bracket is located between components of the frame 12. Such installation/removal requires numerous lifts/releases and attachments/reattachments of the crane (not shown) to the implement in order to maneuver the implement 34 from under tractor 10 and around the frame 12.

Figure 2:
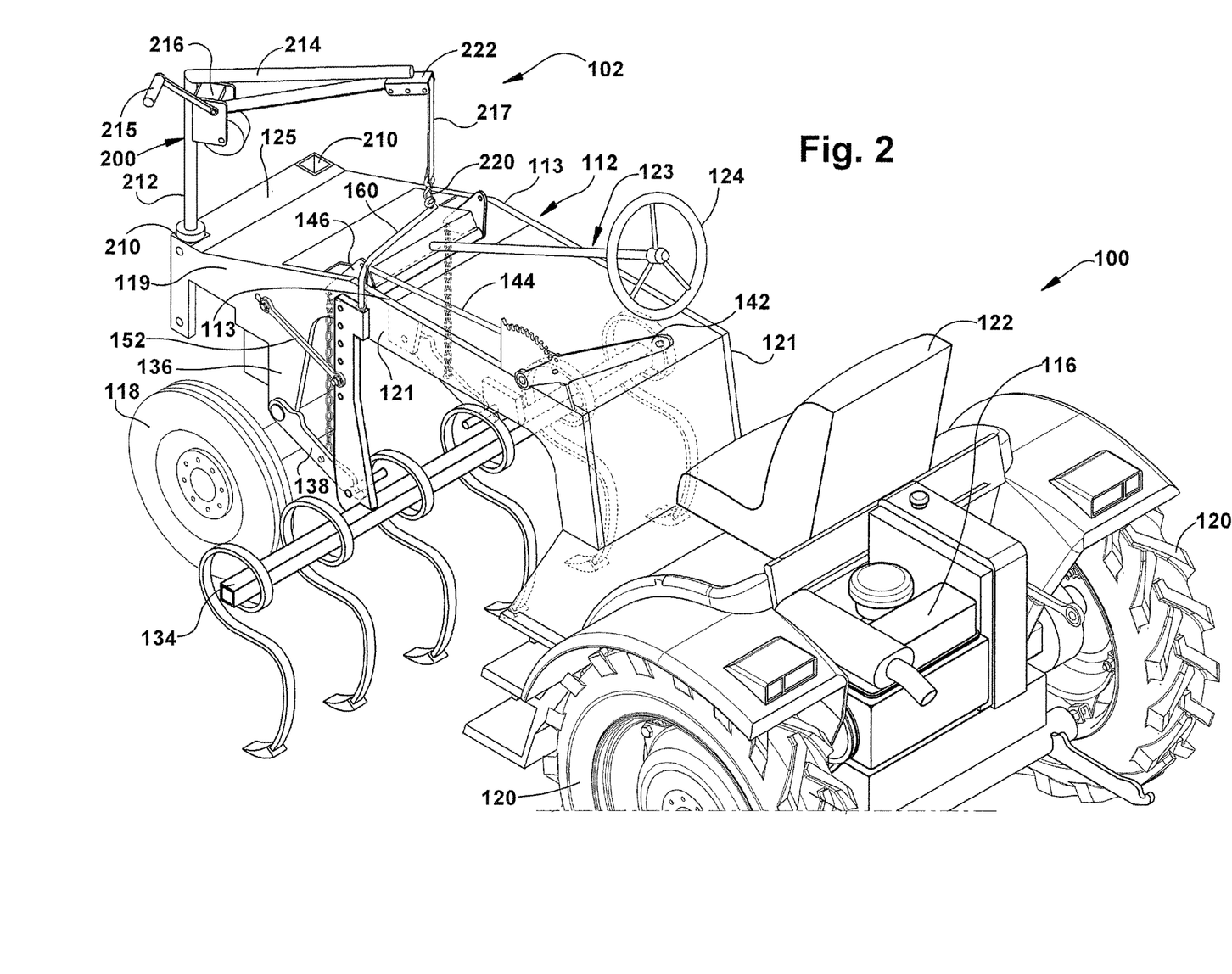
FIG. 2 is a perspective view of a tractor, showing an implement installed under the frame of the tractor utilizing the implement installation/removal system according to one aspect.

The structure and method of the disclosed subject matter overcomes the disadvantages associated with prior art implement installation/removal systems by providing a modified three-point hitch on the tractor, a modified implement and an integrated on-board lift capability which allow for quick and simplified installation/removal. With reference to FIG. 2, a tractor 100 utilizes an implement installation/removal system with a modified three-point hitch attachment system 102 according to one aspect. Tractor 100 is similar in general structure to prior art tractor 10. For the purposes of convenience, only those features that are relevant to the disclosed subject matter will be described in detail with regard to tractor 100.

The tractor 100 generally has a frame 112, an engine 116, a steering system 123, a pair of front wheels 118, a pair of rear wheels 120, an operator seat 122, and a steering wheel 124. Frame 112 includes a pair of longitudinally extending portions or frame rails 113 positioned on opposite sides of the tractor and having a mid-portion with a generally C-shaped configuration. The frame rails 113 extend in substantially the same direction, and preferably parallel to one another. With respect to tractor 100, the majority of components positioned on one side of the tractor 100 will have correspondingly similar components positioned on the other side of the tractor. Accordingly, in this description, when reference is made to a particular frame component of the tractor 100, it will be understood that a similar component is present on the opposite side of the tractor, unless otherwise apparent or stated.

Figure 3:
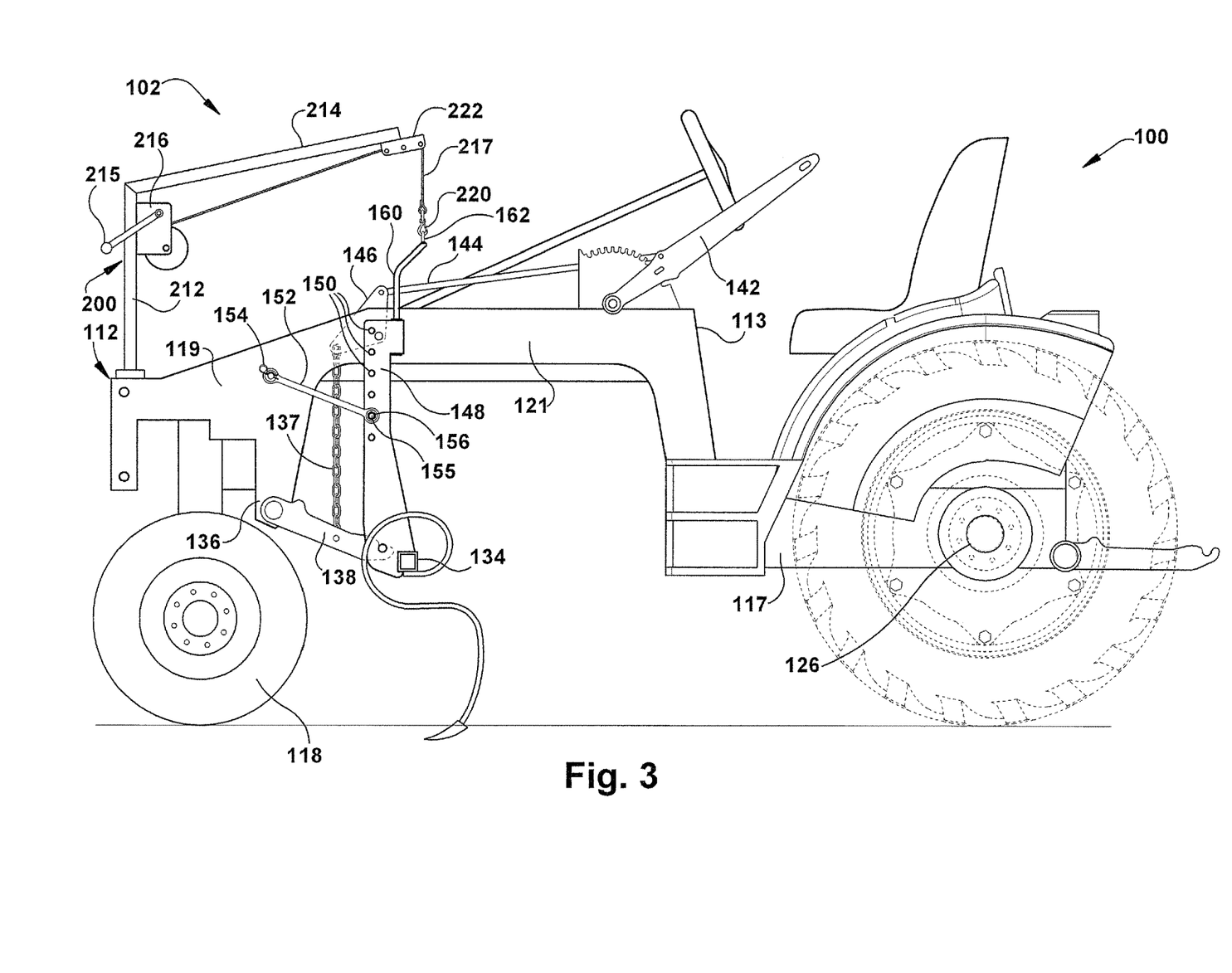
FIG. 3 is a side elevational view of the tractor and implement illustrated in FIG. 2.

Each frame rail 113 has a forward extending front frame section 119, an implement accommodating middle frame section 121, and a rear longitudinally extending rear frame section 117 (FIG. 3). Frame rails 113 feature a plurality of cross braces 125 welded between the frame rails to provide support to the frame 112 and accommodate tractor components.

Each rear frame section 117 supports an axle housing (not shown), which permits a rear drive axle 126 (FIG. 3) to transversely extend through the rear frame sections. The rear wheels 120 are rotatably mounted on drive axle 126 outboard of each longitudinally extending rear frame section 117. The engine 116 and the operator seat 122 are operatively mounted to frame 112.

Figure 4:
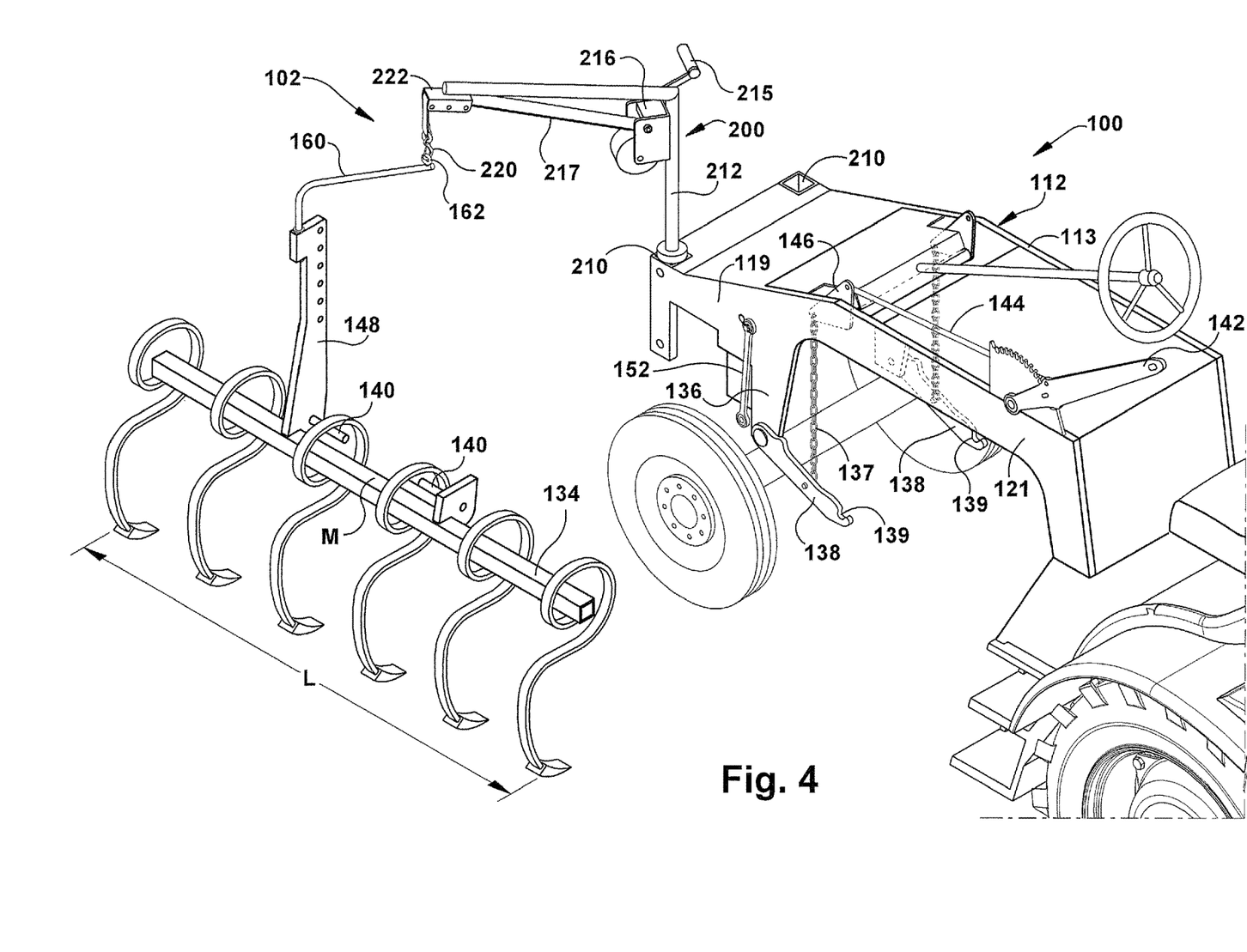
FIG. 4 is a view of the tractor similar to FIG. 2, with the implement in a removed position.

With reference to FIGS. 2 and 4, each front frame section 119 of the frame rail 113 features a crane port 210 integrally formed in the front of each front frame section. The crane ports 210 extend in a substantially vertical direction, as viewed in FIGS. 2-4. A lifting mechanism, such as a crane 200, is removably installed in one of the crane ports 210. As illustrated, each crane port 210 is located outward of the longitudinal centerline of frame 112. It will be apparent that a crane port 210 could be suitably located anywhere along the cross brace 125 of the frame 112.

The crane 200 includes a vertical support beam 212 (FIGS. 2-4). A crane arm 214 extends from, and is fixed to, the vertical support beam 212 by suitable means, such as welding or mechanical fasteners. A lower portion of the vertical support beam 212 is received in the vertical crane port 210 so that the vertical support beam may freely rotate within the crane port and about a longitudinal central axis of the vertical support beam. Installed in this manner, the crane arm 214 may pivot three hundred and sixty degrees around the longitudinal central axis of the vertical support beam 212 and the vertical crane port 210. It will be appreciated that there may be structure or an adapter that fits within the crane port 210 that may receive a portion of the support beam 212 of the crane 200.

A belt winch 216 is fixed to the vertical support beam 212 near an end of the crane arm 214 that is attached to the support beam. A winch pulley 222 is attached to an opposite end of the crane arm 214. A belt 217 extends from belt winch 216 through winch pulley 222, and is attached to an implement attachment clip 220. Operation of a winch crank 215 enables attachment clip 220 to be raised and lowered. Alternatively, other means of hoisting, such as an electric winch, cable, chain and/or rope, may be utilized in conjunction with crane 200. Implement attachment clip 220 is used to attach the implement 134 with the crane 200 during installation/removal of the implement, as will be described.

With reference to FIGS. 2-4, the tractor 100 features the modified three-point hitch attachment system 102 for securing the implement 134 under the frame 112 at the implement accommodating middle frame section 121. The modified three-point hitch attachment system 102 includes two upward facing hitch receiving points 139 (best seen in FIG. 4) and a top link 152. Each hitch receiving point 139 is defined by a surface for supporting the implement 134 with an open end portion facing upwardly.

A downwardly extending arm portion 136 is fixed to front frame section 119. Each of a pair of implement lift arms 138 is pivotally mounted to each downwardly extending arm portion 136 by mechanical means such as pins or bolts, and enables the lift arm to pivot upwardly and downwardly. The implement lift arm 138 extends rearward under the implement accommodating middle frame section 121. The upward facing hitch receiving point 139 is located on a rearward portion of the implement lift arm 138.

An implement depth inner frame unit 146 is pivotally connected to the inboard surfaces of each implement accommodating middle frame sections 121 by mechanical means. Preferably, the depth inner frame unit 146 is attached to an implement lift arm 138 by a chain 137. A depth control lever 142 is pivotally attached to implement accommodating middle frame section 121 of the frame rail 113 (FIG. 3) by mechanical means. A depth control linkage 144 mechanically attaches to inner frame unit 146 and lever arm actuator 142. Attached in this manner, when moved by a vehicle operator, depth control lever 142 can change depth adjustment of the implement 134 during operation of tractor 100. The operator may use hydraulic or electric assist to raise and lower the implement 134.

The implement 134 includes support structure, such as a metal bar, that extends for a length L (FIG. 4) and has a central portion or midpoint M at the middle of the length. The implement 134 may be any suitable implement, such as a tiller, planter, cultivator, hoe, disc, mower, scraper blade and the like. As installed on the tractor 100, the implement 134 has a pair of hitch pins 140 that rest across respective hitch receiving points 139 of implement lift arms 138. Optionally, the hitch pins 140 may be in the form of a single continuous bar or rod. The implement 134 is substantially centered relative to longitudinal centerline of the frame 112. A structural member 148 is attached to the implement 134 and is spaced from the midpoint M of the implement. The structural member 148 extends upwardly from implement 134 so that the inboard surface of the structural member is located outside of the outermost surface of middle frame section 121 when the hitch pins 140 of the implement are received by the hitch receiving points 139. The implement 134 may include structure (not shown) reinforcing and connecting the implement and structural member 148.

A lift bar 160 is mechanically and removably attachable to the top of structural member 148 by bolts or other suitable known means. The lift bar 160 extends upwardly and inwardly over the implement 134 and frame 112 of the tractor 100. An eyehook 162 is welded or otherwise rigidly attached to the upper and inwardly extending end of lift bar 160 at a location about at the longitudinal centerline of the frame 112 of the tractor 100 when the implement is mounted on the lift arms 138 and about at the midpoint M of the implement 134. The eyehook 162 provides a means for attaching crane attachment clip 220 with the implement 134 during installation/removal of the implement from the tractor 100. The lift bar 160 preferably extends inwardly over frame 112 to a distance near and above the midpoint M, that enables the upward force exerted by crane 200, when implement 134 is lifted, to evenly counterbalance the downward force of the implement, resulting in horizontal balance or level of the implement during lifting. The lift bar 160 is typically is not attached to the structural member 148 when the implement 134 is not being installed on or removed from the tractor 100.

The structural member 148 is formed with a plurality of vertically aligned openings 150 (FIG. 3) for adjusting the pitch of the implement 134. The top link 152, featuring a pin and link construction, is mechanically and pivotally attached to a selected one of openings 150 by suitable means, such as a bolt 155 and a nut 156. Top link 152 also is removably attached to front frame section 119 by a spring-loaded lock pin 154. Spring-loaded lock pin 154 provides for quick release of top link 152 from front frame section 119. Together, the top link 152 and hitch receiving points 139 form part of the modified three-point hitch attachment system 102, which provides a means to secure implement 134 underneath the tractor 100.

The modified three-point hitch attachment system 102 and the crane 200 being installed on tractor frame 112 provide an integrated implement installation/removal system, which allows for simple and quick change-out of an implement, such as the implement 134, from the tractor 100. With reference to FIG. 4, during the removal step of a change-out operation of implement 134 from under tractor 100, crane implement attachment clip 220 is attached to eyehook 162 of lift bar 160. Winch 216 is operated to transfer the weight load of implement 134 from the implement lift arms 138 to the crane 200. Once the weight of implement 134 is transferred to the crane 200, top link 152 is detached from the outboard surface of front frame section 119 of frame 112 by removing spring-loaded lock pin 154 from the front frame section. While the top link 152 is shown in FIG. 4 as remaining with the front frame section 119, it is preferred that the top link remain attached to the structural member 148 because the top link typically is length adjustable for a specific implement 134. Once top link 152 is detached from the front frame section 119 of the frame 112, the crane 200 is utilized to lift or raise implement 134 to a sufficient height so that the hitch pins 140 are clear of both upward facing hitch receiving points 139 of the implement lift arms 138. The implement 134 is, thus, free from the implement lift arms 138. The crane arm 214 is then rotated to a position so the implement 134 is no longer under the tractor 100.

The modified three-point hitch attachment system 102 enables unencumbered removal of implement 134 in a single attachment and lift step from under tractor 100 frame 112 because the structural member 148 on the implement 134 is located outward of implement accommodating middle frame section 121. The lift bar 160 extends from the structural member 148 over the implement 134 in a direction towards a vertical plane containing the longitudinal centerline of the tractor 100 or midpoint M of the implement. Once the implement 134 is lifted to sufficiently clear hitch receiving points 139 of the implement lift arms 138, the implement can be removed from under tractor 100 frame 112 without interference by frame components and frame rails 113, as illustrated in FIG. 4. This is done simply by rotating the crane arm 214 about the axis of the vertical support beam 212. Thus, the removal of the implement 134 can be accomplished simply, quickly and by one person.

The crane 200 is integrated into the frame 112 of the tractor 100 and the vertical support beam 212 is located in vertical crane port 210 and freely rotates within the crane port. The crane arm 214 can rotate to enable the attached implement 134 to be moved in an arcuate path to a location away from the tractor 100. In this manner, when crane arm 214 is rotated outwardly from tractor frame 112 to a point about ninety degrees from the frame, the implement 134 is moved from under tractor frame 112 to a position where the implement is clear from the tractor 100, as is shown in FIG. 4, and can rest on an appropriate support surface or structure. The implement attachment clip 220 is then uncoupled from the eyehook 162 of the lift bar 160.

To install a selected implement 134, the removal steps described above are reversed. In this manner, tractor 100 provides a system for easy and convenient installation of an implement 134. Specifically, as illustrated in FIG. 4, the tractor 100 and selected implement 134 to be installed are moved into relatively close proximity. The longitudinal extent or length L of the implement 134 preferably is aligned in about the same direction as the longitudinal centerline of the tractor 100. The structural member 148 on the implement 134 is located about even with the front tire 118. The lift bar 160 that is attached to the structural member 148 preferably extends in a direction generally parallel to the extent or length L of the implement 134.

The crane arm 214 is rotated to a position located outwardly from the tractor frame 112 so the pulley 222 of the crane 200 is situated somewhere above the eyehook 162 of the lift bar 160. The attachment clip 220 of the crane 200 is attached to the eyehook 162 of the lift bar 160. The winch 216 is operated to transfer the weight load of implement 134 to the crane 200. The crane arm 214 is then rotated so the crane 200 can move the attached implement 134 in an arcuate path to a location under the tractor 100, from the position illustrated in FIG. 4 to near the position illustrated in FIG. 2. The, implement 134 is moved to a location under tractor frame 112 where the implement installation may be completed.

The crane 200 lifts or raises the implement 134 to a sufficient clearance height so the hitch pins 140 are above both upward facing hitch receiving points 139 of implement lift arms 138. The hitch pins 140 of the implement 134 may then be lowered onto respective hitch receiving points 139 of implement lift arms 138. The top link 152 is then attached between the implement 134 and the front frame section 119. The lift bar 160 may then be detached from the attachment clip 220 and the crane 200 removed from the frame 112 or placed in a stowed position so it will not interfere with operation of the tractor 100. Thus, the installation of the implement 134 can be accomplished simply, quickly and by one person. While the structural member 148 is illustrated in FIGS. 2-4 as being located on the left side of the tractor 100 it will be appreciated that the structural member may be located on the right side of the tractor, and in some instances may be preferable.

Figure 5:
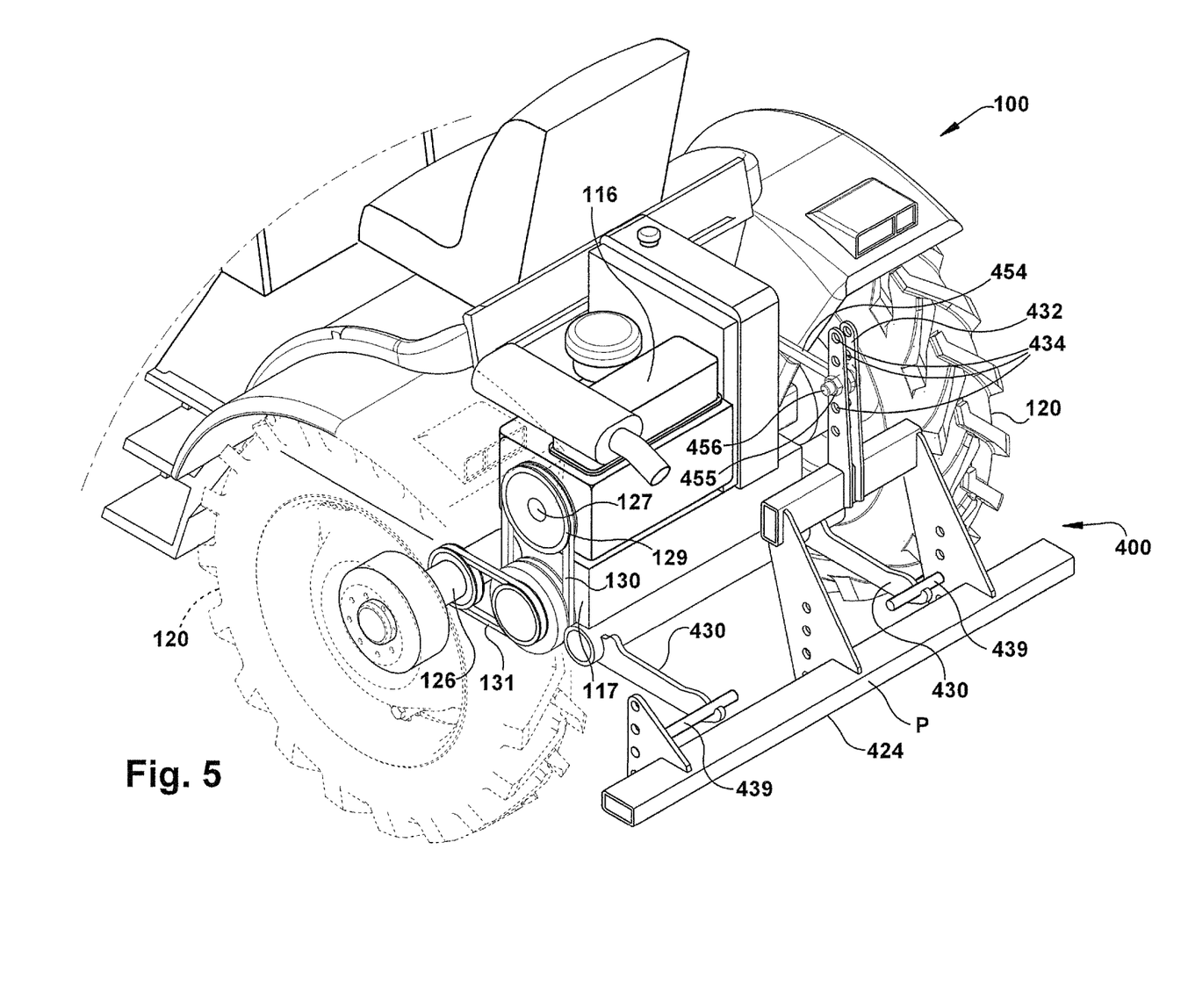
FIG. 5 is a rear perspective view of the tractor of FIG. 2, illustrating a modified three-point hitch according to another aspect.

With reference to FIG. 5, a modified three-point hitch attachment system for securing a rear implement 424 to the back end of tractor 100 according to another aspect is indicated generally at 400. The modified rear three-point hitch attachment system 400 features two implement hitch arms 430. Each implement hitch arm 430 is welded or otherwise rigidly attached to a shaft or tube that is pivotally mounted to the rear frame sections 117 and extends rearward from the back of the frame 112. Each implement hitch arm 430 features an upward facing hitch pin 439 used for attachment of the rear implement 424. It should be apparent that while the rear implement 424 is illustrated as a simple support frame or attachment bar, the illustrated rear implement represents any suitable implement or serve as a device to mount other implements that an operator may have and connect to the attachment bar.

A top link attachment structural member 432 is welded or otherwise rigidly attached to rear implement 424. Top link attachment structural member 432 is positioned offset from the midpoint P of the rear implement 424 and extends upwardly relative to the hitch pins 439. Top link attachment structural member 432 has a plurality of openings 434, which are vertically aligned. Openings 434 provide a means for attaching rear implement 424 to control pitch with respect to the tractor 100.

The modified rear three-point hitch attachment system 400 features a top link 454 with a pin and link construction which is mechanically attached to a selected one of openings 434 by a bolt 455 and a nut 456 for pivotal movement. Top link 454 is further pivotally and removably attached via a linkage to a mechanical lever, which enables control pitch of the rear implement 424. Hydraulic assist may be used by the operator during operation of the tractor to lift, lower and controlled depth of the rear implement 424. Together, top link 454 and upward facing hitch pins 439 form rear three-point hitch system 400, which secures the rear implement 424 to the rear of tractor 100. Optionally, a lever with mechanical advantage may be employed in place of hydraulic or electric assist to lift the rear implement 424.

Attachment of top link 454 to tractor 100 is offset from the longitudinal centerline of frame 112 and enables engine 116 to be positioned in an offset transverse alignment relative to the frame longitudinal centerline. Positioned in this manner, an engine output shaft 127 extends outwardly from engine 116 and is parallel to rear drive axle 126. A pulley 129 is attached to engine output shaft 127. A V-belt 130 connects pulley 129 to a pulley on a transmission. The transmission in turn is mechanically coupled to rear wheels 120 by another V-belt 131. Power transfer from engine 116 by way of V-belts 130, 131 simplifies serviceability of tractor 100, and also reduces the cost and complexity of the tractor when compared to the prior art. This offset of the top link 454 does not interfere with power and drive line components of the tractor 100.

A method for installing and/or removing an implement 134 from a tractor 100 according to yet another aspect is disclosed. The method includes steps that are described above and illustrated in FIGS. 2-4. Specifically, the method of attaching and removing an implement 134 to a vehicle, such as a tractor 100, includes providing the vehicle that has a vehicle frame 112 with a pair of spaced apart frame portions 113. The spaced apart frame portions 113 extend in substantially the same direction. A pair of hitch receiving points 139 connect with the vehicle frame 112. Each receiving point 139 is connected with a respective one of lift arms 138.

An implement 134 is provided that includes support structure, such as a metal bar, having a length L and a midpoint M. A pair of hitch pins 140 are attached to the support structure of the implement 134. The hitch pins 140 are spaced apart in a direction along the length L of the support structure of the implement 134 on opposite sides of the midpoint M. Each hitch pin 140 is mounted in a respective one of the hitch receiving points 139. A structural member 148 is connected to, and forms part of, the support structure of the implement 134. The structural member 148 has at least a portion that is attached to structure outboard of the frame portion 113. A lift mechanism, such as the crane 200, is mounted on a frame portion of the vehicle frame 112. The crane 200 is used to install and remove the implement 134.

To remove the implement 134 from the tractor 100, the attachment clip 220 of the crane 200 is connected to the eyehook 162 of the lift bar 160. The crane 200 is actuated to move the hitch pins 140 of the implement 134 from resting on the hitch receiving points 139 on the lift arms 138. The top link 152 is disconnected from the front frame section 119. The implement 134 can then be swung out from under the tractor 100 without having to lower the implement onto the ground, detach and then reattach a lifting device since the frame 112 does not interfere with the removal steps.

To mount a selected implement 134 onto the tractor 100, the crane attachment clip 220 of the crane 200 is connected to the eyehook 162 of the lift bar 160. The crane 200 is actuated to lift the implement 134 from its storage location. The crane arm 214 is rotated. The implement 134 can then be swung under the tractor 100 without having to lower the implement onto the ground, detach and then reattach a lifting device to maneuver around the frame 112. The hitch pins 140 are placed above the hitch receiving points 139. The crane 200 then lowers the implement 134 until the hitch pins 140 are located in the hitch receiving points 139 on the lift arms 138. The top link 152 that is connected to the structural member 148 is then attached to the front frame section 119. The crane 200 is then disconnected from the implement 134. The crane 200 may be removed from the tractor 100 and the lift bar 160 detached from the structural member 148 so the crane and lift bar do not interfere with operation of the tractor or vision of the operator.

The method includes attaching the structural member 148 to the implement 134 at a location offset from the midpoint M of the structural member. The method also includes locating the entire structural member 148 outside of the vehicle frame 112. The method includes providing a top link 152 that is removably attachable between the structural member 148 and the vehicle frame 112. The method further includes providing a lift bar 160 connectable with the structural member 148 and has an end portion extendable in a direction towards a plane extending normal to a midpoint M of the implement 134. The lift bar 160 has an intermediate portion extending between the structural member 148 and end portion. The lift bar 160 is constructed and positioned, when attached to the structural member 148, so the vehicle frame 112 does not impede removal and installation of the implement 134.

The crane 200 and modified three-point hitch attachment system 102 of the disclosed subject matter and method provide an implement installation/removal system that enables simple and quick change out of implements installed under the frame of a tractor, thereby decreasing equipment downtime. Additionally, the modified rear three-point hitch attachment system 400 of the disclosed subject matter provides an implement attachment system for implements 424 attached to the rear of a tractor that has an offset attachment structural member 432 to free up space that can be occupied by powertrain components.

It is to be understood that the structure, arrangement and method of the above-described implement installation/removal systems for agricultural tractors of the disclosed aspect may be altered or rearranged without affecting the overall concept or operation of the disclosed subject matter. In addition, the implement installation/removal systems for agricultural tractors of the disclosed aspect may be employed with other types of tractors than those shown and described above, without affecting the overall concept or operation of the disclosed subject matter.

The disclosed subject matter has been described with reference to a specific embodiment. It is to be understood that this illustration is by way an example and not by way of limitation. Potential modifications and alterations will occur to others upon a reading and understanding of this disclosure, and it is understood that the invention includes all such modifications, alterations, and equivalents thereof. From the above description of at least one aspect, those skilled in the art will perceive improvements, changes and modifications. Such improvements, changes and modifications within the skill of the art are intended to be covered by the appended claims.

What is claimed is:

1. An attachment system comprising:
   a vehicle having a vehicle frame with a pair of spaced apart frame portions;
   a pair of receiving points, each receiving point being connectable with a respective one of the frame portions and located under the vehicle frame;
   an implement comprising:
      a support structure having a length;
      a pair of hitch pins associated with the support structure and spaced apart in a direction along the length of the support structure, each hitch pin for operative attachment to a respective one of the receiving points; and
      a structural member having a lower portion attached to the support structure at a distance offset from a central portion of the length of the support structure and an upper portion for attachment to the vehicle frame, the upper portion being offset from the central portion of the length of the support structure at the same distance as the lower portion; and
   a lift mechanism connectable with a portion of the vehicle frame, the lift mechanism is attachable with the structural member to move the hitch pins relative to the receiving points.

2. The attachment system of claim 1 wherein the structural member is attached to the implement at a location offset in a direction along the length of the implement from the midpoint of the length of the implement.

3. The attachment system of claim 1 wherein the upper portion of the structural member is adjacent to and exterior of one of the pair of spaced apart frame portions when the pair of hitch pins are attached to the pair of receiving points.

4. The attachment system of claim 3 wherein the structural member further includes a lift bar extending upwardly and inwardly therefrom and above the vehicle frame.

5. The attachment system of claim 1 wherein the implement is free of any rigid structure extending vertically from a midpoint of the support structure.

6. The attachment system of claim 1 wherein the vehicle further comprises:
   a pair of front wheels; and
   a pair of rear wheels, wherein the implement is disposed intermediate to the pair of front wheels and the pair of rear wheels when the pair of hitch pins are attached to the pair of receiving points.

7. The attachment system of claim 6 wherein a midpoint the length of the implement is aligned with a midpoint between the spaced apart frame portions when the pair of hitch pins are attached to the pair of receiving points.

8. A method of installing and removing an implement under a vehicle, the method comprising the steps of:
   providing a vehicle having a vehicle frame with a pair of spaced apart frame portions;
   connecting a pair of hitch receiving points with the vehicle frame, each hitch receiving point being connected with a respective one of the frame portions;
   providing an implement that includes support structure having a length, a pair of hitch pins associated with the support structure and spaced apart in a direction along the length of the support structure, each hitch pin for operative attachment to a respective one of the hitch receiving points, and a structural member having a lower portion attached to the support structure at a distance offset from a central portion of the length of the support structure and an upper portion for attachment to the vehicle frame, the upper portion being offset from the central portion of the length of the support structure at the same distance as the lower portion; and
   installing or removing the implement with a lift mechanism connected with a portion of the vehicle frame, the lift mechanism is attachable with the structural member to move the hitch pins relative to the hitch receiving points.

9. The method of claim 8 further including the step of attaching the structural member to the implement at a location offset in a direction along the length of the implement from the midpoint of the length of the implement.

10. The method of claim 8 wherein the structural member further includes a lift bar extending upwardly and inwardly therefrom and above the vehicle frame, the lift bar adapted to attach to the lift mechanism.

11. The method of claim 8 wherein the vehicle further comprises:
    a pair of front wheels; and
    a pair of rear wheels, wherein the implement is disposed intermediate to the pair of front wheels and the pair of rear wheels when the pair of hitch pins are engaged with the pair of hitch receiving points.

12. The method of claim 11 wherein the lift mechanism is pivotally attached to the vehicle frame and operable to rotate the implement between a first position intermediate the pair of front wheels and the pair of rear wheels wherein the pair of hitch pins are engaged with the pair of hitch receiving points and a second position wherein the implement is exterior and to the side of the vehicle.

13. The method of claim 12 wherein the upper portion of the structural member is adjacent to and exterior of one of the pair of spaced apart frame portions when the implement is in the first position.

* * * * *